Oct. 20, 1931.  W. J. SCHLACKS  1,828,547
GEAR BOX CONTROL
Filed July 28, 1928    5 Sheets-Sheet 3

Inventor
William J. Schlacks
George E. Mueller
Atty.

Oct. 20, 1931. W. J. SCHLACKS 1,828,547
GEAR BOX CONTROL
Filed July 28, 1928 5 Sheets-Sheet 4

Inventor
William J. Schlacks
George E. Mueller
Atty.

Oct. 20, 1931.  W. J. SCHLACKS  1,828,547
GEAR BOX CONTROL
Filed July 28, 1928   5 Sheets-Sheet 5

Fig.10

Inventor
William J. Schlacks
George E. Mueller, Atty.

Patented Oct. 20, 1931

1,828,547

UNITED STATES PATENT OFFICE

WILLIAM J. SCHLACKS, OF CHICAGO, ILLINOIS, ASSIGNOR TO RYAN MNFG. CORPORATION, OF CHICAGO, ILLINOIS, A CORPORATION OF ILLINOIS

GEAR BOX CONTROL

Application filed July 28, 1928. Serial No. 295,913.

My invention relates in general to road graders. It relates more particularly to a power driven road grader operated by a central power plant carried by the grader frame and having improved means for transmitting the power from the power plant to the adjustable portions of the grader.

Among the principal objects of my invention is the provision of an improved road grader.

Another object is to provide a power adjusted road grader having improved controlling means.

A further and very important object is the provision of a controlling mechanism which will at all times be under the convenient control of the operator independent of the position or adjustment of the grader.

Another object is the provision of a motor controlled gear box for receiving the power from the central power plant and transmitting it to the adjustable portions of the grader.

Another object is the provision with such a gear box of a safety clutch mechanism for avoiding the application of unsafe loads on any of the grader parts.

Another object is the provision of a motor controlled gear box having a plurality of operating levers all within easy reach of an operator.

Another object is the provision of a gear box for a motor controlled grader which will be entirely enclosed and designed to run in oil, the position of the grader having no effect on the operation of such gear box.

Another object is the provision of such a gear box which will be simple and easy to assemble.

Other objects and features of the invention will be apparent from a consideration of the following detailed description taken with the accompanying drawings, wherein.

Referring now to the drawings wherein like characters of reference are employed to designate similar members throughout the several views, the grader has a main frame 10 with engine brackets 11 on which an internal combustion motor 12 is mounted. The motor has a drive shaft 13 to which a sheave pulley 14 is connected and this by means of a belt 16 drives a pulley 17 mounted on a shaft 18 leading into a gear box casing 19. The gear box casing is mounted on the end of the frame as shown and is provided with operating levers 21 and 22 in two horizontal rows as shown which, in a manner to be described, function to interconnect a series of gears to drive the various grader adjustments. A pair of brackets 23 is secured to the end of the grader frame and support a platform 24 on which the operator stands. This platform has its sides 24a sloping upwardly so that the operator will always have a sure footing on the platform. A railing 26 is secured partly to the brackets 23 and partly to the platform and serves as a guard for protection of the operator.

In the grader to which my invention is applied, the frame is pivoted to a rear axle 27 to which is also secured a gear segment 28 which is therefore immovable. A worm 29 carried by the frame moves the frame bodily about the pivot, this worm being driven through suitable connections from the gear box 19. Accordingly the motor gear box, driving pulley and operating platform all move with the grader frame.

In the arrangement of the gear box per se, a cover 31 is provided; and on this cover a great deal of the gear box mechanism is mounted. The arrangement is such that with some of the equipment mounted in the gear box casing itself, and the balance thereof mounted on the cover, the assembly is completed by simply mounting the cover in place, this having the effect of intermeshing the various gears etc., so that the entire mechanism is operable. In order to strengthen the cover to permit carrying the load of the apparatus assembled thereon, a pair of strengthening ribs 32 are provided, and the cover is held in position by cap screws 33. A gasket 34 disposed between the cover and casing assists in obtaining an oil-tight joint.

Figure 4:
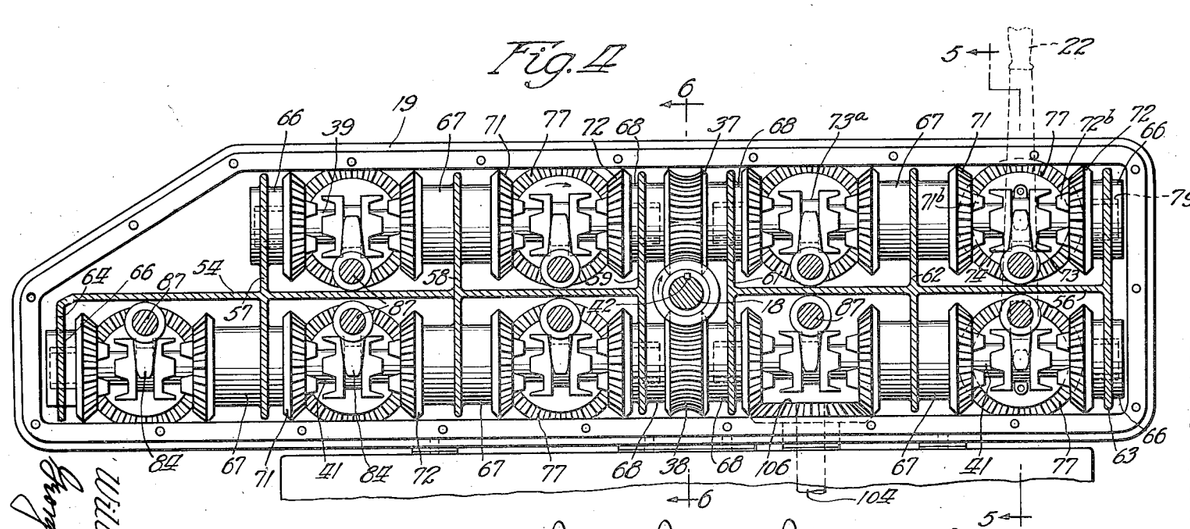
Fig. 4 is a sectional view taken along the line 4—4 of Fig. 5 looking in the direction of the arrows.
Figures 5, 8, 9:
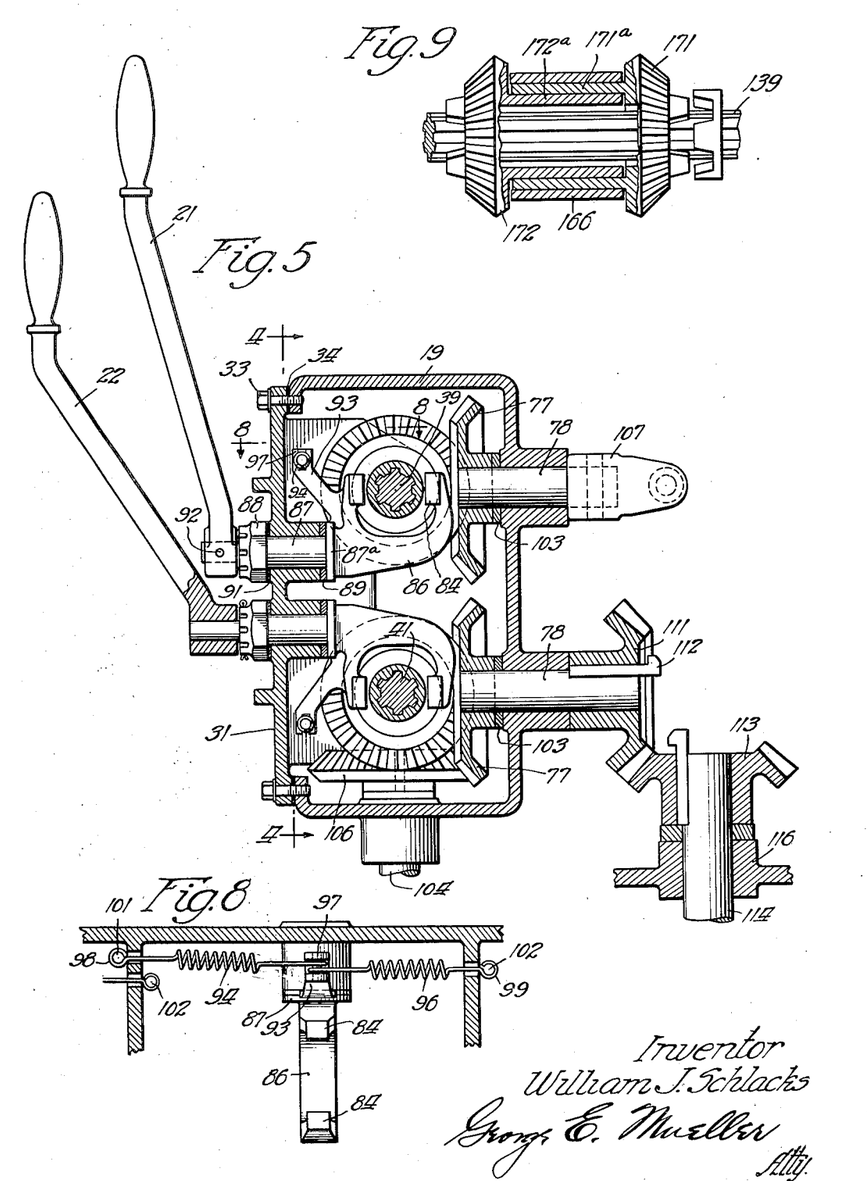
Fig. 5 is a sectional view taken along the line 5—5 of Fig. 4.
Fig. 8 is a fragmentary plan sectional view taken along the line 8—8 of Fig. 5, and showing the manner of returning the clutch operating levers to mutual positions.
Fig. 9 is a view showing a modified bearing arrangement by means of which the length of the gear box can be conserved.
Figure 6:
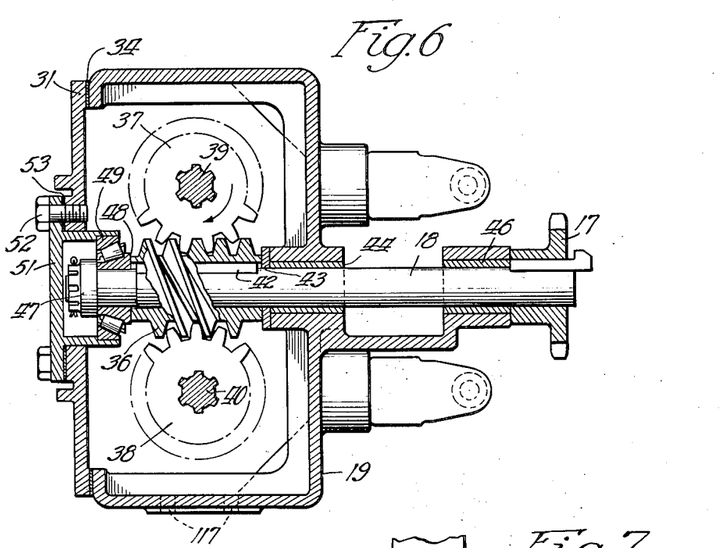
Fig. 6 is a vertical sectional view taken along the line 6—6 of Fig. 4 and showing the driving connection for the gear box.

Referrng now more particularly to Figs. 4 to 9 inclusive, a drive shaft 18 extending under the gear box has a worm 36 meshing with worm gears 37 and 38 carried on transverse splined shafts 39 and 41, respectively. In the assembling of the shaft 18, the worm 36 is secured thereto by a key 42 and the worm bears against a packing washer 43. Bearing surface is provided by a bearing 44 secured in the casing proper, while an additional bearing 46 is provided in a bracket struck from the side of the casing as shown in Fig. 6. The end of the shaft 18 is provided with a castle nut 47 and a roller-bearing 48 is disposed between the nut and the end of the worm. The roller bearing is of a combination thrust and radial type, the rollers bearing against a bushing 49 carried by a cap 51 secured in an aperture in the cover by cap screws 52. A gasket 53 serves to make the joint between the cap and cover oil tight.

The cover 31 is provided with a pair of horizontally aligned transverse webs 54 and 56 with a plurality of vertical webs 57, 58 and 59, connected with and crossing the web 54 at right angles, with similar webs 61, 62 and 63 bearing the same relationship to the web 56. The web 54 has a continuous web 64 at right angles thereto extending upwardly, this construction resulting from one of the shafts being longer than the other.

The bearings for the splined shafts 39 and 41 are carried by the webs on the cover and the clutch mechanisms for interengaging the driving and driven members are mounted between the webs. The manner in which this arrangement is carried out will now be described.

It will be seen that the horizontal webs divide the gear casing into two substantially identical units, with the exception that one is longer than the other. Each one of the end webs has an integral cylindrical boss 66, while bosses 67—67 of double length are provided intermediate the ends. Adjacent the worm gears 37 and 38 are similar integral cylindrical bosses 68—68. These boss portions as a whole act as bearings for the various clutch members as well as for the splined shafts.

The arrangement for the various clutch mechanisms is substantially the same in each instance, there being nine double reversing clutch mechanisms in all. A single one of these mechanisms will now be described as exemplifying the construction throughout.

Consider the upper right hand clutch mechanism as shown in Fig. 4. A pair of bevel gears 71 and 72 have their hubs 71a and 72a (Fig. 7) extending into the boss 66 and 67 respectively, the bearings for the gears being between the outside of the hubs and the inside surface of the bosses. The faces of the gears are provided with clutch teeth 71b and 72b, respectively. These gears are larger than the splined shaft so they do not come in contact therewith, the shaft being free to turn within them. A clutch member 73 is splined (Fig. 5) on the shaft and has teeth 74 and 76 adapted to cooperate with, and interengage the clutch teeth 71b and 72b on the bevel gears. The bevel gears 71 and 72 both engage a third bevel gear 77 carried on a shaft 78 journaled in the gear box casing. Consequently the gear 77 is adapted to be driven in either direction depending upon which bevel gear 71 and 72 of the clutch member 73 is in engagement with. Since the shaft 78 is adapted to be connected by suitable means to an adjustable portion of the grader, this adjustable portion can be moved in either direction.

Figure 7:
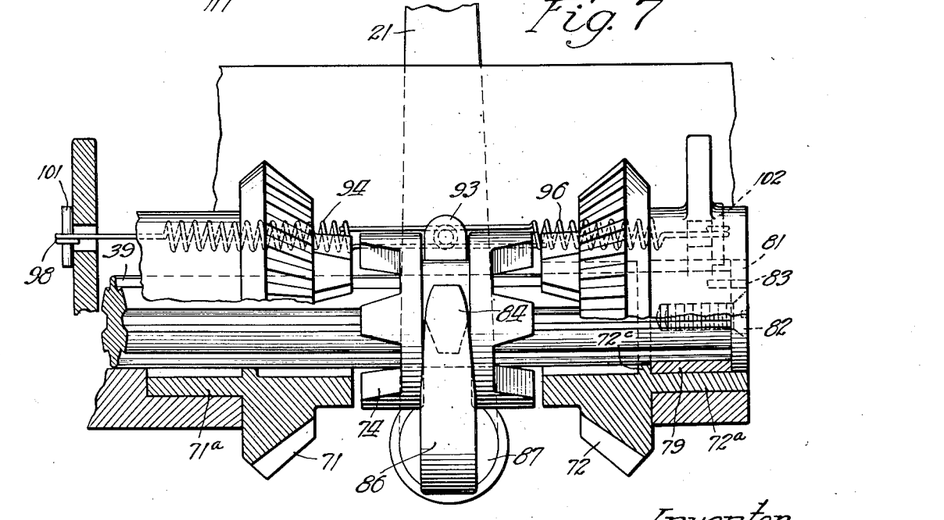
Fig. 7 has an enlarged fragmentary view showing certain features of the gear box.

The bearings for the splined shaft are in the inside of the bevel gears 71 and 72, there being four in number for each shaft. As shown in Fig. 7, a splined collar 79 is provided and extends under the hub portion 72a so that the bearing and the splined shaft is between the splined collar 79 and the hub of the gear. These bearings are provided in the cylindrical portions 66 and 68, there being two of each for each shaft. Accordingly, the radial bearings for the shafts are at the end thereof, with two in the center adjacent the drive.

In order to furnish a thrust bearing for the shaft, a disc 81 is secured at each end thereof by a machine screw 82 which is prevented from turning off the shaft by a dowel pin 83. The bevel gears 71 and 72 fit loosely within the circular bosses but they are prevented from sliding toward the clutch member 73 by their engagement with the common bevel gear 77. Since the bevel gears 71 and 72 are not free to move, the end thrust of the splined shaft is taken by an annular inner flange 71c or 72c as the case may be.

I have already described that the clutch members 73 turn with the splined shaft and are longitudinally adjustable thereon by means of the operating levers 21 and 22 to engage the clutch faces 71b and 72b on the bevel gears and so turn the gears selectively to drive the various grader adjustments in either direction. In order to operate the clutch members, I provide a simple arrangement by means of which a direct and logical engagement is obtained. This mechanism will be described as a single unit since it is the same for each clutch with the single exception that the upper and lower clutch operating members are inverted.

The clutch member 73 has an annular recess 73a in which the fingers 84—84 of a clutch shifting hand or fork 86 extend. The clutch shifting fork has integral therewith a shaft 87 extending through the cover and secured thereto by a castle nut 88. This nut of course is cottered to prevent its turning. To prevent leakage of oil around the shaft 87, an oil gasket 89 is provided, this being clamped between a boss on the cover and a frame 87a on the shaft. A similar washer or gasket 91 may also be provided underneath the castle nut. The operating lever 21 or 22 is secured to the projecting end of the shaft 87 by a pin 92.

Consulting Figs. 4 and 7, it is observed that the engaging faces between the clutch member and the clutch teeth 71b and 72b on the gears are at a considerable angle to each other; that is, the faces are not horizontal with respect to the longitudinal axes of the shafts. For this reason, it requires some effort to hold the clutch in engagement and this is particularly true if the load is heavy. Indeed when a heavy obstacle is encountered when using the clutch, it will be drawn out of engagement before any damage is done. I employ auxiliary means however, to hold the clutch in a neutral position when the operating levers are disengaged. The clutch shifting hand 86 has an upwardly or downwardly extending arm 93 depending upon whether it is above or below, and this arm is bifurcated (Figs. 5 and 8) to receive the end links 94 and 96, a pin 97 being employed to hold the spring ends in this position. The other ends of the springs are provided with links 98 and 99 extending through slots in the horizontal webs and prevented from disengaging itself therefrom by cotter-pins 101 and 102. The links through which the pin 94 extends are elongated (Fig. 7) so that movement in one direction will tension one spring but will not affect the other spring in any way, and the spring so placed under tension will serve to return the entire clutch shifting mechanism including the operating levers to normal position. As was previously pointed out, the driven gear 77 is mounted on a shaft 78 leading to an adjustable member on the grader, the connections in each case varying somewhat with the structural characteristics of the member to be driven, and to a certain extent its position with respect to the gear box. In each instance, however, a packing washer 103 is provided to prevent oil leakage about the shaft.

Figure 3:
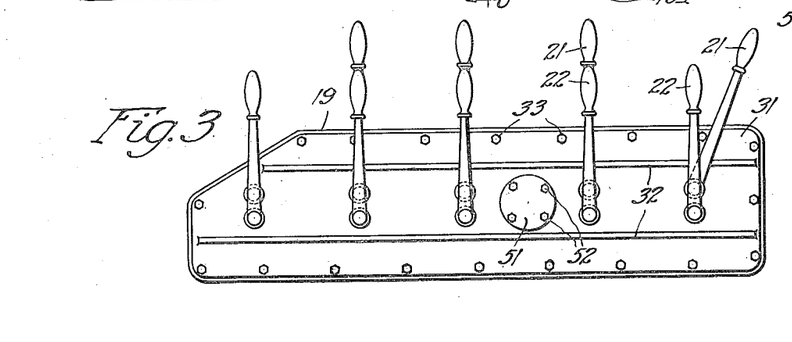
Fig. 3 is a rear elevational view of the gear box.

The various driven shafts are arranged with particular attention paid to the accessibility of the various operating members for performing various operations. It is of course obvious that all of the levers are within easy reach of the operator while standing in a single position on the platform, but the operator is aided very greatly by the grouping of the levers, and such a grouping is shown in Fig. 3. For example, the right hand crank is at the right side above and the left hand crank at the left side above. Within easy reach of each and immediately below the left crank is the side shift arrangement. Since the side shift and cranks are often used together, this arrangement is handy. The front wheel leaning adjustment and steering adjustment for turning the tongue are also often used together and they are positioned close to each other. There are many operations performed with other combinations and the grouping is arranged to require as few moves on the part of the operator as possible. For an understanding of the adjustments controlled by these levers, reference may be had to several co-pending applications of myself, Clyde B. Faverty, and D. C. Hinds, all the property of the same assignee.

All of the shafts 78 extend horizontally through the back of the casing 19 with the exception of the drive for the rear wheel leaning mechanism. The shaft 104 extends vertically through the bottom of the casing and is in all other respects the same as the shafts 78. It is driven by a bevel gear 106, which is mounted between two gears 71 and 72 in exactly the same way as the gear 77 except that it is faced at right angles thereto. The shaft 104 extends downwardly and forms a connection with the rear wheel leaning mechanism but it is not shown here in detail as it does not constitute a necessary part of the present invention.

Figures 1, 2:
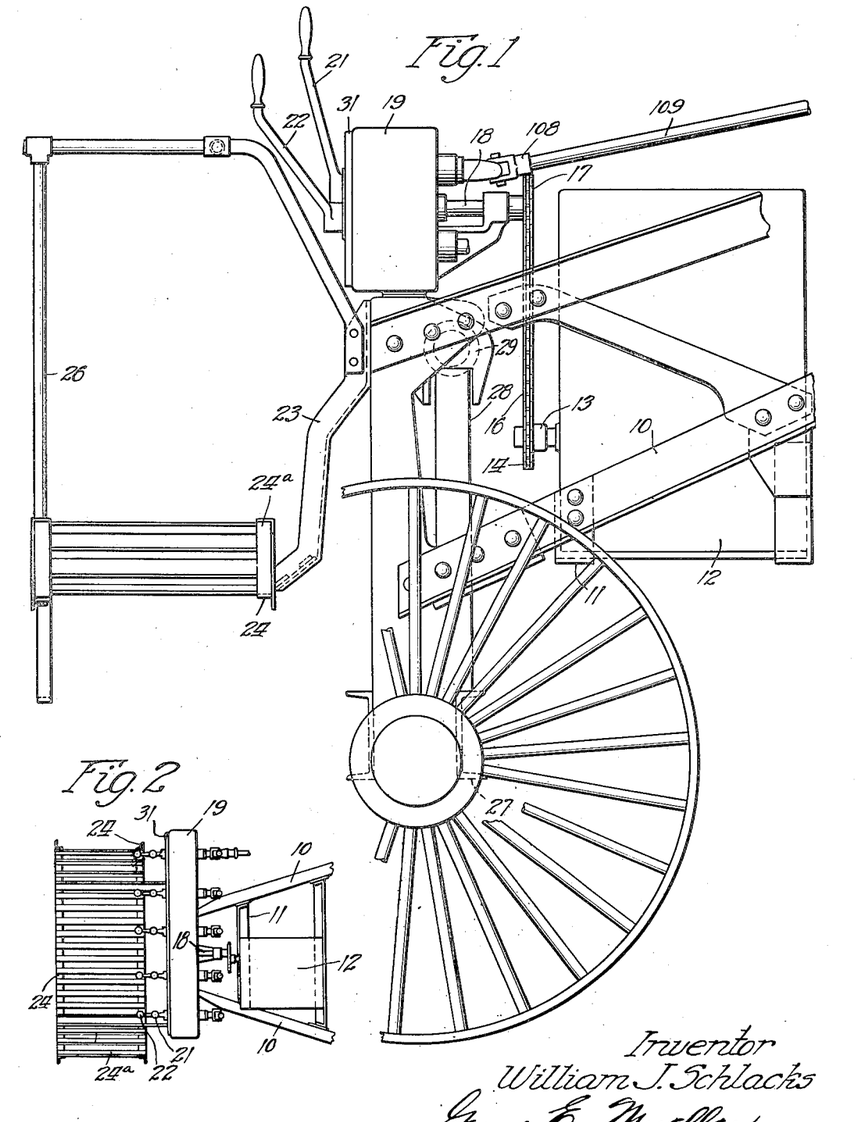
Fig. 1 is an enlarged fragmentary elevational view showing the arrangement at the rear of the grader including the relative locations of the motor gear box and operator's platform.
Fig. 2 is a small plan view of Fig. 1.

All but one of the shafts 78 extending through the vertical wall of the casing 19 have a coupling member 107 secured thereto, this coupling member being part of a universal joint, the other portion thereof 108 (Fig. 1) being secured to a driven shaft 109 leading over the grader frame to the position in which the part is used. The shaft 78, however, driving the frame leaning mechanism has a bevel gear 111 secured to its projecting end by a key 112 and this bevel gear engages with a second bevel gear 113 keyed to a vertical shaft 114 and journaled in a bearing 116. This shaft 114 is employed in any suitable way to drive the frame leaning mechanism. The arrangement simply illustrates the way the take-off may be modified to take care of adjusting mechanisms in various positions.

In order to shorten the gear box still more as I prefer to do with the smaller sizes of graders, I may employ the modified structure of Fig. 9. In this modification the boss 166 is narrower than in the main form and the hub 171a of the gear 171 is journaled in the boss 166 and the hub 172a of the gear 172 is journaled on the inside of the hub 171a. In this way ample bearing surface can be retained and the gear box reduced considerably in length. The splined shaft 139 would have the same form as in the main form. The gear box with this arrangement would be in every other respect substantially the same.

In order to further acquaint those skilled in the art with the details of my invention, I shall now point out some of its operating features and advantages. In the first place, it secures a great advantage not heretofore accomplished in graders, and that is that all of the clutch engaging mechanism is enclosed within a dust proof casing and will never be affected by the presence of mud, water and other impedimenta so frequently encountered when a machine is exposed to all kinds of weather etc., as a grading machine is. The casing is filled with oil to a height sufficient to maintain a heavy film on all of the moving parts at all times. Consequently the parts which normally require replacing before a grader is very old are now found to outlive the grader itself and require practically no attention whatsoever.

Besides the simplicity in employing my invention, it includes a safety feature of very great advantage in this art. It was previously pointed out, that the engaging faces between the clutch members and the clutch teeth on the gears were arranged at such an angle that the clutch had to be held into engagement, particularly against a load. This is substantially the reverse of what happens in most clutches of this kind, when it is found that almost super-human effort is necessary to disengage a clutch once it has formed a driving connection. The angle of these clutch faces is controlled with a factor of safety in view so that the force required to break any moving part, is greatly in excess of that which can possibly be exerted by any ordinary operator through the medium of the clutch. The clutch will kick out against the handhold lever whenever an extraordinary load is encountered.

The slanting faces of the clutch act as a safety feature but result in a construction facilitating the engagement of the clutch. In other words, with normal loads, the effort required to operate the levers and engage the clutches, is comparatively small and it will entail no undue expenditure of energy over a full working day for one man to operate the grader continuously.

Considerable advantage is obtained by driving the shaft from the center in the manner shown and described because in this way a much simpler and more compact arrangement results. The splined shafts can be made considerably lighter than if the drive were from one end and the bearings are also simplified. It also permits the arrangement as shown with the motor immediately in front of the gear box and the gear box immediately in front of the operator's platform with all of the operating levers within easy reach. This is an ideal arrangement.

It is a natural result of driving the two splined shafts together from the center in the manner shown, that one of such shafts will be driven in one direction and the other shaft driven in the opposite direction. To overcome this difficulty, the clutch forks are arranged in the manner shown with the upper row of forks extending upwardly and the lower row thereof extending downwardly. The result is that when an operating lever in the upper row is thrown to the right, the corresponding clutch member will also be moved to the right and be caused to engage the right hand bevel gear of its associated pair of bevel gears. This will cause the corresponding driven shaft also to be rotated in a right hand direction. When an operating lever in a lower row is drawn to the right, however, the clutch fork is drawn to the left, but inasmuch as the associated splined shaft is turned in the reverse direction to the upper splined shaft, the result will be that the corresponding driven shaft will be turned to the right. In other words, the difference in the direction of rotation of the two shafts is compensated for and the throw of an operating lever independent of the place where it is situated, will cause the corresponding driven shaft to be rotated in a direction corresponding to that in which the lever is thrown. This is a very great practical advantage from an operating standpoint.

One of the big advantages with my gear box is the easy way in which it can be assembled. Practically all of the parts are interchangeable, the hubs of the gears 71 and 72 simply sliding into position in the bosses 67. The gear 77, gear 106 and the drive assembly on the shaft 18 are assembled on the gear box casing with all of the rest of the mechanism assembled on the cover. Accordingly, all that is required to assemble the complete gear box is to secure the cover on the casing, the various gears intermeshing with no difficulty whatsoever. The worm 36 of course must be turned as the cover is put into position and after the cover is bolted down with the cap-screws 33, the cap 51 is placed into position and secured by the cap-screws 52. When assembled the gear box is secured on the frame by cap-screws extending through screw apertures 117. This makes it unnecessary to employ any special ears, projections, or the like from the casing. It also makes a better mounting.

Figure 10:
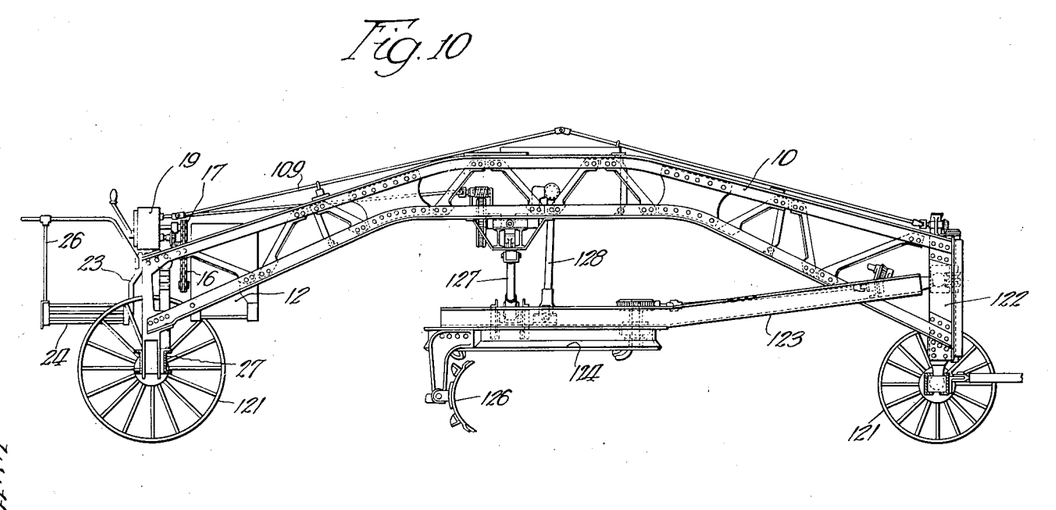
Fig. 10 is a side elevational view of a complete grader.

As previously described the invention is adapted for use in connection with a road grader having a plurality of adjustments, and I show in Fig. 10 a side elevational view of such a grader. The arrangement and construction at the rear thereof is substantially the same as shown and described in connection with Fig. 1. Accordingly this will not be described in detail with Fig. 10. The main frame 10, is tiltable on the front and rear carriages and such carriges have wheels 121 adapted to be leaned by suitable wheel leaning mechanism. The frame has a front post 122 to which the front of a drawbar 123 is connected by a universal joint. This connection is of such a nature that the front end of the drawbar can be reciprocated vertically within the front post. The drawbar carries circular frame 124, and the circular frame supports a moldboard 126. The rear end of the drawbar is supported by links 127 and 128 controlled by suitable mechanism for lowering or raising the rear end of the drawbar and for tilting it or adjusting it in other respects. A suitable shaft extends from the gear box 19 to the various adjustments, so that all adjustable portions of the grader are controlled by the operation of the levers 21 and 22.

Although I have described in considerable detail all of the specific features of my invention, it is obvious that I am not restricted to this particular form and the invention is limited only by the scope of the appended claims.

What I claim as new and desire to secure by United States Letters Patent is:

1. In a power adjusted road grader, a main frame with a plurality of adjustable grader elements thereon, a motor secured on the frame, a gear box positioned behind the motor, an operator's platform immediately behind the gear box, and a double row of reversing clutches forming a part of said gear box mechanism adapted to be operated to cause the motor to move any one of said adjustable elements in either direction, said clutch mechanisms being operated by correspondingly placed operating levers at the rear of the gear box within easy reach of an operator standing on the platform.

2. In a road grader having a plurality of adjustable grader elements, a gear box comprising a housing, a continuously rotating shaft, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, and means for sliding said clutch members into driving engagement with either of said bevel gears selectively to drive in either direction the shafts projecting through the housing.

3. The combination defined in claim 2 wherein the hubs of each pair of beveled gears are journaled one within the other, and said other within one of said bosses as described.

4. In a road grader having a plurality of adjustable grader elements, a gear box comprising a housing, a continuously rotating shaft therein, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, means for sliding said clutch members into driving engagement with either of said bevel gears selectively to drive in either direction the shafts projecting through the housing, and means normally tending to hold said clutch members in disengaged position.

5. In a road grader having a plurality of adjustable grader elements, a gear box comprising a housing, a continuously rotating shaft therein, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, means for sliding said clutch members into driving engagement with either of said bevel gears selectively to drive in either direction the shafts projecting through the housing, said clutch members and clutch faces being formed to automatically disengage the clutch members when a load greater than a pre-determined amount is encountered.

6. In a road grader having a plurality of adjustable grader elements, a gear box comprising a housing, a continuously rotating shaft therein, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, means for sliding said clutch members into driving engagement with either of said bevel gears selectively to drive in either direction shafts projecting through the housing, and a collar splined on the shaft and journaled within one of the hubs on one of said bevel gears whereby a bearing for the continuously rotating shaft is provided.

7. In a road grader having a plurality of adjustable grader elements, a gear box comprising a housing, a continuously rotating shaft therein, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, a clutch engaging fork having an engagement with the clutch member and having its shank extending through the housing, and an operating lever secured to the projecting end of said shank.

8. In a road grader having a plurality of adjustable grader elements, a gear box comprising a housing, a continuously rotating shaft therein, a plurality of bosses carried by the housing through which the shaft extends, a plurality of pairs of bevel gears having hubs journaled in said bosses, a plurality of gears meshing with said pairs of bevel gears and having shafts projecting through the housing and adapted to be employed for driving adjustable grader elements, a plurality of clutch members, one formed on the face of each of said pairs of bevel gears, clutch members splined on said shaft and having clutch faces complementary to and facing the clutch portions of said bevel gears, a clutch engaging fork having an engagement with the clutch member and having its shank extending through the housing, an operating lever secured to the projecting end of said shank, and a pair of balancing and neutralizing springs secured to the clutch fork normally tending to hold said clutch fork and said clutch member in neutral position.

In witness whereof, I hereunto subscribe my name this 1st day of May, 1928.

WILLIAM J. SCHLACKS.